(12) United States Patent
Chiba

(10) Patent No.: US 9,477,885 B2
(45) Date of Patent: Oct. 25, 2016

(54) IMAGE PROCESSING APPARATUS, IMAGE PROCESSING METHOD AND IMAGE PROCESSING PROGRAM

(71) Applicant: RAKUTEN, INC., Tokyo (JP)

(72) Inventor: Naoki Chiba, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/562,888

(22) Filed: Dec. 8, 2014

(65) Prior Publication Data

US 2016/0026859 A1    Jan. 28, 2016

(30) Foreign Application Priority Data

Jul. 25, 2014 (JP) .................................. 2014-151883

(51) Int. Cl.
  *G06K 9/00* (2006.01)
  *G06K 9/34* (2006.01)
  *G06K 9/46* (2006.01)

(52) U.S. Cl.
  CPC ....... *G06K 9/00456* (2013.01); *G06K 9/00416* (2013.01); *G06K 9/342* (2013.01); *G06K 9/4604* (2013.01)

(58) Field of Classification Search
  None
  See application file for complete search history.

(56) References Cited

U.S. PATENT DOCUMENTS

| 2005/0041868 A1* | 2/2005 | Chupeau | G06K 9/00228 382/195 |
| 2009/0285482 A1* | 11/2009 | Epshtein | G06K 9/00463 382/176 |
| 2015/0055857 A1* | 2/2015 | Wang | G06K 9/3258 382/165 |

OTHER PUBLICATIONS

Detecting Text in Natuaral Scenes with Stroke Width Transform. Boris Epshtein, Eyal Ofek and Yonatan Wexler. 2010.*
B. Epshtein, E. Ofek and Y. Wexler, "Detecting Text in Natural Scenes with Stroke Width Transform", IEEE Conference on Computer Vision and Pattern Recognition, 2010, p. 1-p. 8.
Georg Poier et al., "Text Localization in Unconstrained Images", 17th computer Vision Winter Workshop, Feb. 1, 2012, XP055241349.
Wang K et al , "Character location in scene images from digital camera", Pattern Recognition, Elsevier, GB, vol. 36, No. 10, Oct. 1, 2003, pp. 2287-2299, XP004439123.

* cited by examiner

*Primary Examiner* — Edward Park
*Assistant Examiner* — Delomia L Gilliard
(74) *Attorney, Agent, or Firm* — Sughrue Mion, PLLC

(57) ABSTRACT

An image processing apparatus according to one embodiment includes a first extraction unit, a second extraction unit, and a specifying unit. The first extraction unit performs stroke width transform on an image and thereby extracts a SWT region from the image. The second extraction unit performs clustering based on pixel values on the image and thereby extracts a single-color region from the image. The specifying unit specifies a pixel group included in a candidate text region based at least on the single-color region when a ratio of the number of pixels in an overlap part between the SWT region and the single-color region to the number of pixels in the single-color region is equal to or more than a first reference value, or more than the first reference value.

11 Claims, 18 Drawing Sheets

IMAGE PROCESSING APPARATUS, IMAGE PROCESSING METHOD AND IMAGE PROCESSING PROGRAM

BACKGROUND OF THE INVENTION

1. Field of the Invention

One aspect of the present invention relates to an image processing apparatus, an image processing method, and an image processing program.

2. Related Background Art

One of the existing techniques to extract a text region from an image is Stroke Width Transform (SWT) that extracts a region where a width between edges, which is a stroke width, is constant as a candidate text region (cf. Non-Patent Literature 1 below). Further, there is a technique that uses Maximally Stable External Regions (MSER) that specifies a region enclosed by a stable closed curve through an edge in combination with the SWT.

Non-Patent Literature 1: B. Epshtein, E. Ofek and Y. Wexler, "Detecting Text in Natural Scenes with Stroke Width Transform," IEEE Conference on Computer Vision and Pattern Recognition, 2010, pp. 1-8

SUMMARY OF THE INVENTION

However, in the techniques that extract a candidate text region based on edges, such as the SWT and the MSER, the accuracy of extraction of a text region is degraded in the event of a failure in the first edge detection. For example, when the background of a text region has a plurality of colors and there is a part where the edge between the text region and the background region is weak, the weak edge cannot be detected even with use of both of the SWT and the MSER, which causes a failure to extract the text region as a result. It is thus desired to more reliably extract a text region from an image.

An image processing apparatus according to one aspect of the present invention includes a first extraction unit configured to perform stroke width transform on an image and thereby extract a SWT region from the image, the SWT region being a region having a continuous edge and a stroke width within a set range; a second extraction unit configured to perform clustering based on pixel values on the image and thereby extract a single-color region from the image, the single-color region being a region composed of a plurality of pixels having pixel values within a set range and present continuously; and a specifying unit configured to specify a pixel group included in a candidate text region based at least on the single-color region when the ratio of the number of pixels in an overlap part between the SWT region and the single-color region to the number of pixels in the single-color region is equal to or more than a first reference value, or more than the first reference value.

An image processing method according to one aspect of the present invention is an image processing method performed by an image processing apparatus including a processor, the method including a first extraction step of performing stroke width transform on an image and thereby extracting a SWT region from the image, the SWT region being a region having a continuous edge and a stroke width within a set range; a second extraction step of performing clustering based on pixel values on the image and thereby extracting a single-color region from the image, the single-color region being a region composed of a plurality of pixels having pixel values within a set range and present continuously; and a specifying step of specifying a pixel group included in a candidate text region based at least on the single-color region when a ratio of the number of pixels in an overlap part between the SWT region and the single-color region to the number of pixels in the single-color region is equal to or more than a first reference value, or more than the first reference value.

An image processing program according to one aspect of the present invention causes a computer to function as a first extraction unit to perform stroke width transform on an image and thereby extract a SWT region from the image, the SWT region being a region having a continuous edge and a stroke width within a set range; a second extraction unit to perform clustering based on pixel values on the image and thereby extract a single-color region from the image, the single-color region being a region composed of a plurality of pixels having pixel values within a set range and present continuously; and a specifying unit to specify a pixel group included in a candidate text region based at least on the single-color region when a ratio of the number of pixels in an overlap part between the SWT region and the single-color region to the number of pixels in the single-color region is equal to or more than a first reference value, or more than the first reference value.

In the above aspects, in addition to extraction of a SWT region by SWT, extraction of a single-color region by clustering based on pixel values is performed independently of the SWT. Then, when an overlap part between the SWT region and the single-color region has a certain ratio to the single-color region, a pixel group included in a candidate text region is specified. In this manner, by using a technique based on pixel values, not edges, in combination with the SWT and using two types of regions obtained from those two techniques, it is possible to make up for disadvantages of the technique based on edges and more reliably extract a text region from an image.

According to one aspect of the present invention, it is possible to more reliably extract a text region from an image.

DESCRIPTION OF THE PREFERRED EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an image processing apparatus 10 according to the embodiment are described hereinafter with reference to FIGS. 1 to 14. The image processing apparatus 10 is a computer system that extracts a candidate text region from image data.

"Image" in this specification is an image where an object is fixed on a medium so that it can be perceived by the human sense of sight. Further, "image data" is computer-processable data that represents an image. Thus, the image in this specification is recorded in a storage device such as a memory and output to an output device such as a monitor by processing of a processor, thereby becoming visible. The image may be a still image or each frame that forms a moving image. Examples of the still image are a photograph, a picture and the like, and examples of the moving image are a video, an animation and the like, though the type of the image is not limited thereto. The image may be obtained by electronic equipment such as a camera or a scanner or may be created by computer graphics.

"Candidate text region" in this specification is a region where it is estimated that text is present in the image. "Text" in this specification is the concept including a mark, a figure or the like of a certain shape.

Processing results of the image processing apparatus 10 can be used for various processing to be performed subsequently. For example, the processing results can be applied to determination of a large amount of product image data that are used in a virtual shopping mall which sells a large variety of products. In general, product images used in a virtual shopping mall include images (product pictures) in which only a product is shown and images in which text is superimposed on product pictures. Examples of the text in the product pictures are a sales message such as "free shipping", a price, a shop name and the like. The text may be inserted by image editing software or photographed together with a main subject. There are cases where an administrator of a virtual shopping mall wants to use only images (non-text images) in which text is not drawn or photographed, eliminating images (text images) in which text is drawn or photographed. For example, when an administrator wants to show the sales price at each of virtual shops for one product on a web page, it is desirable to use a non-text image (for example, an image showing the product only) as a representative image of the product.

As a precondition to meet such a request, it is desirable to make sure to extract candidate text regions from image data.

Figure 1:
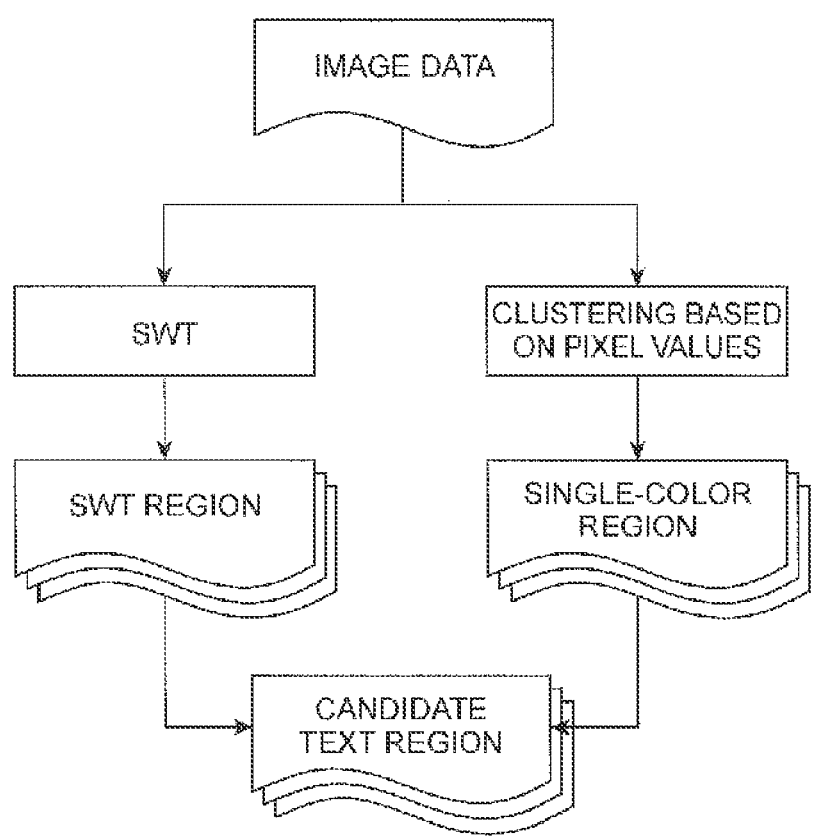
FIG. 1 is a diagram showing the concept of extraction of a candidate text region according to an embodiment.

FIG. 1 is a view showing the concept of this embodiment for achieving such highly accurate extraction. The image processing apparatus 10 performs Stroke Width Transform (SWT) on one image data and thereby extracts one or more SWT regions from the image data. Further, the image processing apparatus 10 performs clustering based on pixel values on the image data and thereby extracts one or more single-color regions from the image data. The image processing apparatus 10 extracts final candidate text regions based on the SWT regions and the single-color regions obtained by independently applying the two techniques in the above manner. Although the details of the SWT regions and the single-color regions are described later, the two types of regions are used for specifying a group of pixels for final candidate text regions.

Figure 2:
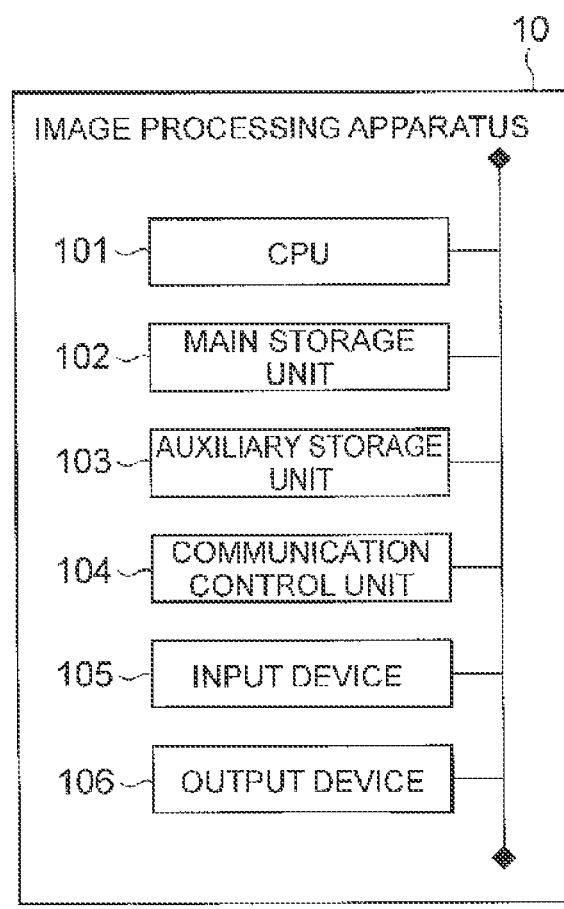
FIG. 2 is a diagram showing a hardware configuration of an image processing apparatus according to the embodiment.

FIG. 2 shows a typical hardware configuration of the image processing apparatus 10. The image processing apparatus 10 includes a CPU (processor) 101 that executes an operating system, an application program and the like, a main storage unit 102 such as ROM and RAM, an auxiliary storage unit 103 such as a hard disk and a flash memory, a communication control unit 104 such as a network card or a wireless communication module, an input device 105 such as a keyboard and a mouse, and an output device 106 such as a display and a printer.

The functional elements of the image processing apparatus 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103.

Although the image processing apparatus 10 may be composed of one computer or composed of a plurality of computers. In the case of using a plurality of computers, those computers are connected through a communication network such as the Internet or an intranet.

Figure 3:
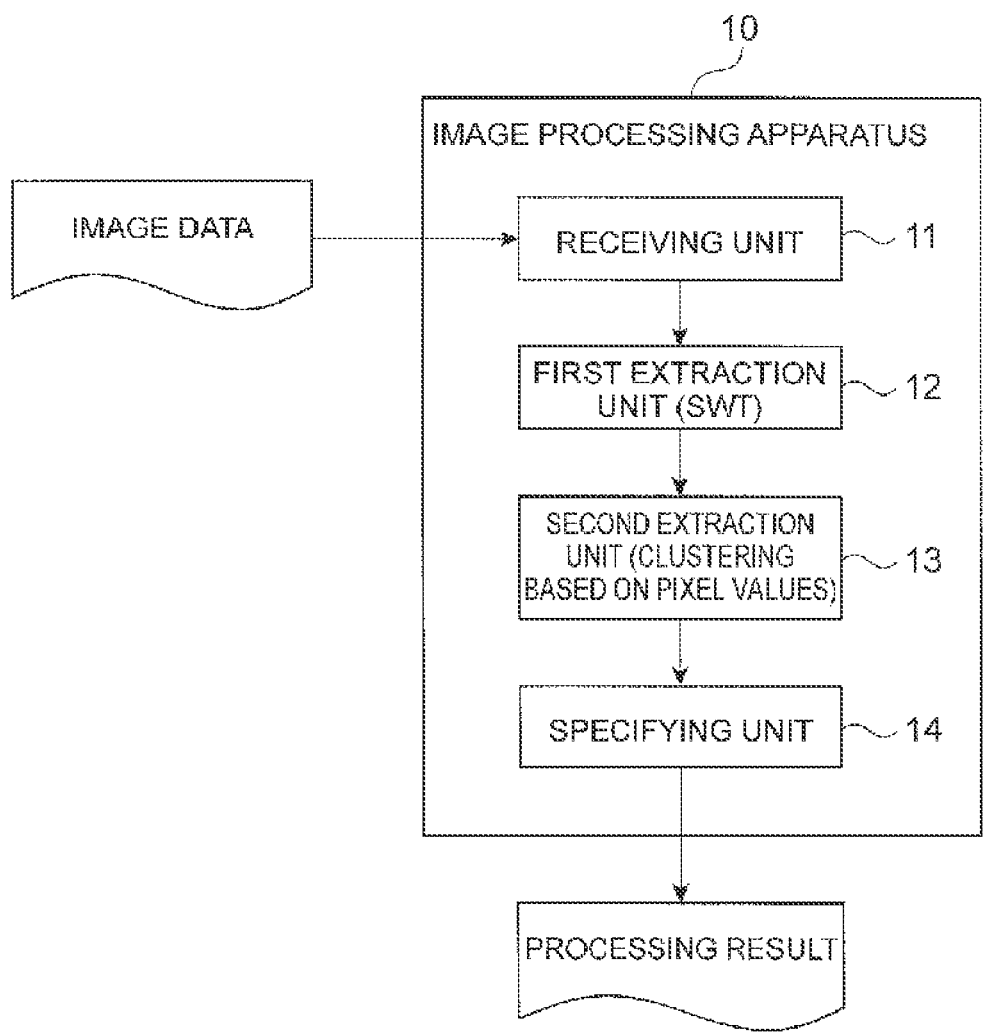
FIG. 3 is a block diagram showing a functional configuration of the image processing apparatus according to the embodiment.

As shown in FIG. 3, the image processing apparatus 10 includes a receiving unit 11, a first extraction unit 12, a second extraction unit 13, and a specifying unit 14 as functional elements.

The receiving unit 11 is a functional element that receives image data for which candidate text regions are to be specified. A method of acquiring the image data is not particularly limited, and the receiving unit 11 may receive the image data that is input by user operation or may receive the image data that is transmitted from another information processing device through a communication network. The receiving unit 11 outputs the image data to the first extraction unit 12.

The first extraction unit 12 is a functional element that performs SWT on image data and thereby extracts SWT regions. The SWT is a known technique as taught by the Non-Patent Literature 1 described above, and it is a technique based on the observations that the stroke width of text is generally substantially constant in the text. Note that the "stroke width" in this specification is the width of the line (line width) that forms the text.

The first extraction unit 12 converts the input image into a gray-scale image (black-and-white image), estimates the edge, which is the boundary between a text region and another region (background region) by the Canny method and thereby finds a pair of edges. First, the first extraction unit 12 specifies each edge by using a preset edge threshold Ta. Next, starting from the pixel of a certain edge, the first extraction unit 12 searches a specified range (for example, gradient direction ±π/6) including the gradient direction of the pixel and thereby finds the pixel of the edge having the same edge intensity as the starting point and having a different edge direction from the starting point. The first extraction unit 12 then records a stroke width for each of those two pixels and one or more pixels present between the two pixels along a scan line in the search. The first extraction unit 12 performs this processing for all of the pixels forming the edge and thereby records the stroke widths for those pixels. Note that, in the case where a plurality of scan lines pass through a certain edge and thereby several different stroke widths can be recorded for the edge, the first extraction unit 12 records the minimum value of the stroke width for the edge.

Figure 4:
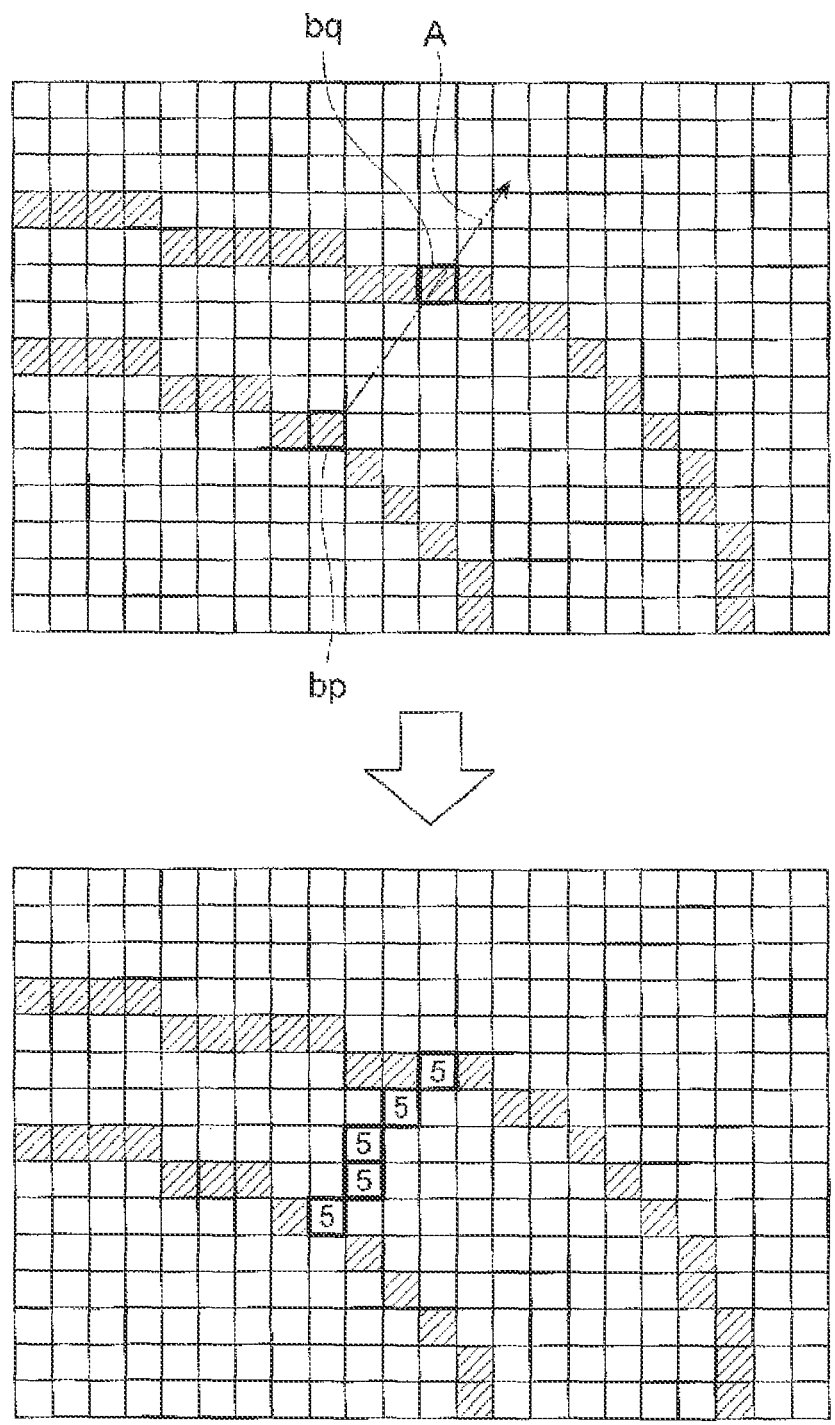
FIG. 4 is a diagram illustrating Stroke Width Transform (SWT).

FIG. 4 shows an example of recording a stroke width. In this figure, the pixels specified as edges are shown with hatching. In this example, the first extraction unit 12 makes a search along the scan line A with the pixel by of the edge as the starting point and thereby finds the edge bq of the edge on the opposite side, and then records the stroke width "5" for the pair of edges by and bq and three edges located between the pair along the scan line A.

After recording the stroke width for at least some of the pixels in the image data, the first extraction unit 12 extracts a region where the edge is continuous and the stroke width is within a set range as the SWT region. The SWT region is a continuous region where the stroke width, which is the distance between edges having opposite gradient directions from each other, is within a set range. The condition that "the stroke width is within a set range" means that the stroke width is substantially constant, and the "set range" for determining whether or not to satisfy this condition may be set arbitrarily. The timing of "setting" for the term "set range", which is the time when the range is set, is not particularly limited, and the range may be set in advance before the processing of extracting the SWT region or may be set during the processing. For example, the first extraction unit 12 may extract a region where the edge is continuous and an error of the stroke width is within a range of −2 to +2 as the SWT region. The first extraction unit 12 can extract one or more SWT regions.

Figure 5:
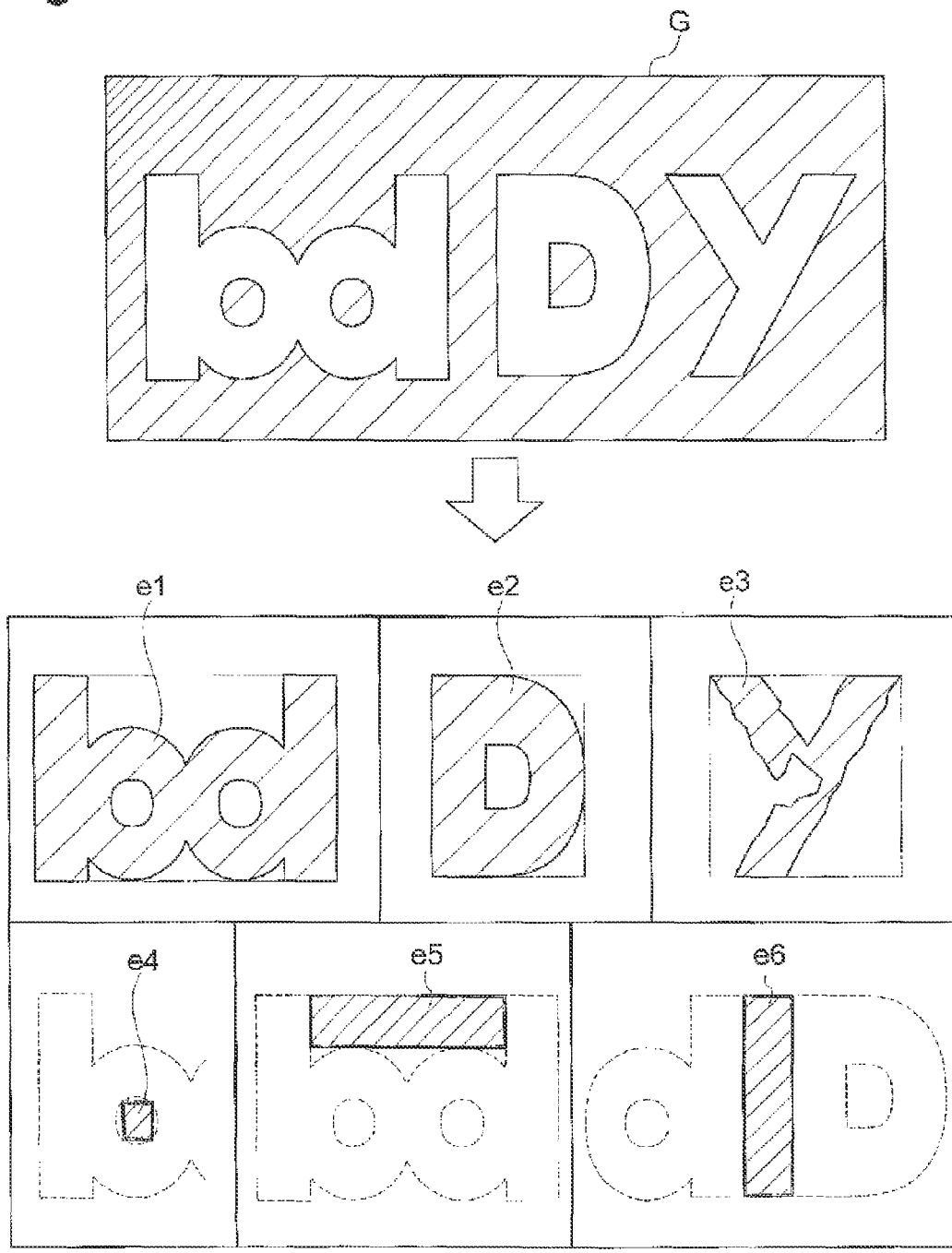
FIG. 5 is a diagram showing an example of extracting SWT regions.

FIG. 5 shows an example of a plurality of SWT regions e1 to e6 extracted from an image G (image data). In this example, the SWT regions e1 and e2 almost faithfully show the parts "bd" and "D" that are recognized as the text by humans. On the other hand, there is a case where the SWT region, such as the SWT region e3, that corresponds to the part "y" that is recognized as the text by humans but lacks the part that does not satisfy the condition of the stroke width is extracted. In the SWT region e3, the joint of strokes in the letter "y" is missing, which is one tendency of the SWT. Another tendency of the SWT is that a corner (for example, the corner of the letter "L") is missing, although not shown in FIG. 5. The lack of the joint and the corner is due to the fact that the stroke width is not within a certain range in those parts. Further, although not shown in FIG. 5, there is a case where some edge cannot be specified due to the closeness of the pixel value between the text and the background, and a part that actually corresponds to one letter is detected separately as two or more SWT regions. There is also a case where a part that is recognized as the background by humans is extracted as the SWT region, such as the SWT regions e4 to e6. For example, when a region where the distance between the edges is substantially constant is present in one letter (for example, the SWT region e4) or between two letters (for example, the SWT regions e5 and e6), such a region can be determined as the stroke.

Although the SWT regions extracted by the first extraction unit 12 are not always accurate as described above, after the first extraction unit 12 extracts one or more SWT regions anyway, it generates component data for each of the SWT regions. The component data representing one SWT region contains the following data items.

Reference coordinates (Xe,Ye) of the circumscribed rectangle of the SWT region
Width We of the circumscribed rectangle
Height He of the circumscribed rectangle
Coordinates and stroke width $(xe_i, ye_i, w_i)$ of each pixel $pe_i$ included in the SWT region For example, when the SWT region is composed of twenty pixels $pe_1$ to $pe_{20}$, the component data contains $(xe_1, ye_1, w_1), (xe_2, ye_2, w_2), \ldots, (xe_{20}, ye_{20}, w_{20})$.

In FIG. 5, the circumscribed rectangle of each SWT region is indicated by dashed lines. Although the coordinates of the upper left vertex of the circumscribed rectangle, for example, may be set as the reference coordinates of the circumscribed rectangle of the SWT region, other coordinates may be set as the reference coordinates as long as the position of the circumscribed rectangle can be specified.

Because a certain range can be set for the stroke width in one SWT region as described above, the stroke width $w_i$ is not always the same in the component data of one SWT region.

The first extraction unit 12 outputs the component data of one or more SWT regions, together with the image data, to the second extraction unit 13.

The second extraction unit 13 is a functional element that performs clustering based on pixel values on image data and thereby extracts single-color regions from the image data. The single-color region is a region that is represented by a plurality of pixels whose pixel values are within a set range and which are present continuously. If the pixel value of a pixel adjacent (vertically, horizontally or diagonally) to one pixel whose pixel value is within a set range is also within the set range, two those pixels are regarded as being present continuously. In the clustering based on pixel values as well, the timing of "setting" for the term "set range", which is the time when the range is set, is not particularly limited, and the range may be set in advance before the processing of extracting the single-color region or may be set during the processing.

First, the second extraction unit 13 refers to the component data of the SWT regions input from the first extraction unit 12 and determines one or more regions for which clustering based on pixel values is to be performed as clustering target regions. The second extraction unit 13 determines each clustering target region so that every SWT regions is included in any clustering target region. For example, the second extraction unit 13 may determine each clustering target region so that each clustering target region at least includes one SWT region and a margin of the SWT region. The size of the margin may be determined arbitrarily, and the circumscribed rectangle of the SWT region and the additional 25% of the height and the width of the circumscribed rectangle may be set as the margin, for example.

Figure 6:
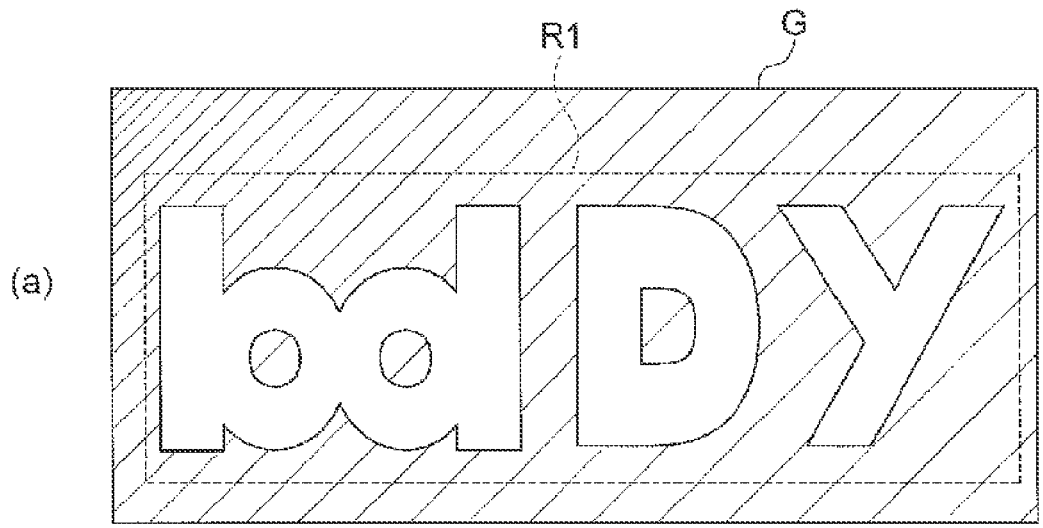
FIG. 6 is a diagram showing examples of setting a clustering target region.
Figure 6:
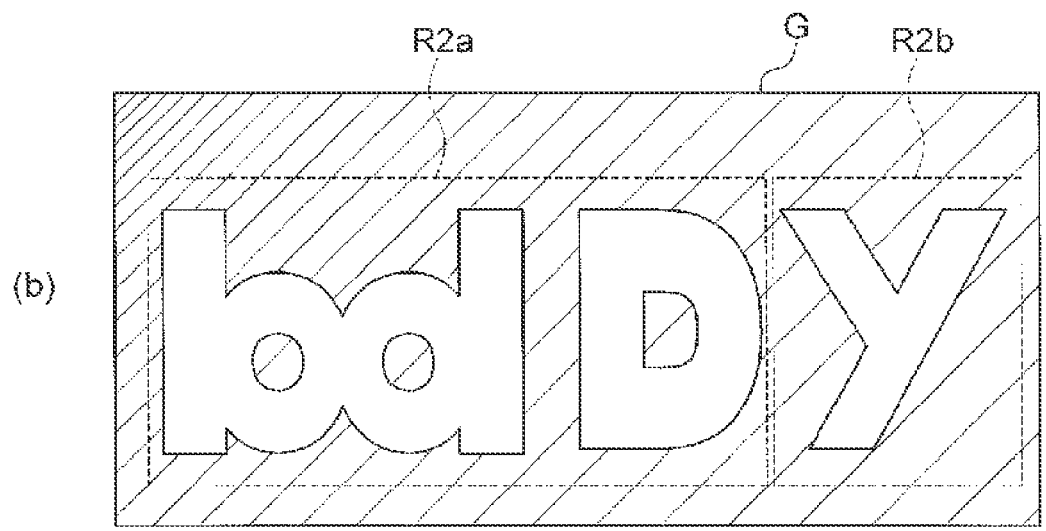

FIG. 6 is a diagram showing examples of clustering target regions. (a) of FIG. 6 shows a clustering target region R1 that includes all of the SWT regions e1 to e6 shown in FIG. 5 and the margins of those SWT regions. (b) of FIG. 6 shows a clustering target region R2a that includes the SWT regions e1, e2, e4 to e6 and the margins of those five SWT regions and a clustering target region R2b that includes the SWT region e3 and its margin. In this manner, a method of setting a clustering target region is not limited to one; however, in any way, the total of the clustering target region is a part of the input image.

The clustering based on pixel values is a technique based on the observations that a letter string or each letter is generally in the same color. Examples of the clustering based on pixel values include color clustering using colors in three-dimensional color space and gray clustering using one-dimensional color space. In the case of using the gray clustering, the second extraction unit 13 converts the input image into a gray-scale image (black-and-white image) before performing the clustering.

The second extraction unit 13 performs the clustering based on pixel values after reducing the number of colors (the amount of information about colors). For example, the second extraction unit 13 may perform clustering using the k-means method. In this technique, the second extraction unit 13 reduces the number of colors by using the k-means method for clustering and then performs the clustering and, after the clustering, performs region division based on the topology analysis on each color clustering. By this processing, the second extraction unit 13 specifies a plurality of pixels whose colors are substantially the same and which are present continuously as one single-color region.

Alternatively, the second extraction unit 13 may use the technique for clustering disclosed in the following reference 1. According to the technique of the reference 1, the second extraction unit 13 calculates the median of each bin (color cluster) of the histogram of color values created based on the color space where the amount of information is reduced, integrates the clusters that are similar in color and thereby generates a plurality of representative clusters. Then, the second extraction unit 13 specifies a plurality of pixels that correspond to the same representative cluster and are present continuously as one single-color region by using the connectivity analysis, which is a basic technique of binary image processing.

(Reference 1) Shuji Senda, Michihiko Minoh and Katsuo Ikeda, "A Method of Extraction of Character Patterns from a Color Image Based on the Uniformity of the Character Color of a String", Technical Report of the Institute of Electronics, Information and Communication Engineers, PRU: Pattern Recognition and Understanding, 94 (242), 17-24, Sep. 22, 1994

As described above, a specific technique of the clustering based on pixel values is not particularly limited, and the second extraction unit 13 may extract single-color regions from a clustering target region by an arbitrary method. It should be noted that, although one color cluster corresponds to one single-color region, because one color cluster can include a plurality of pixel values, each of the pixel values that constitute one single-color region is not always the same.

Figure 7:
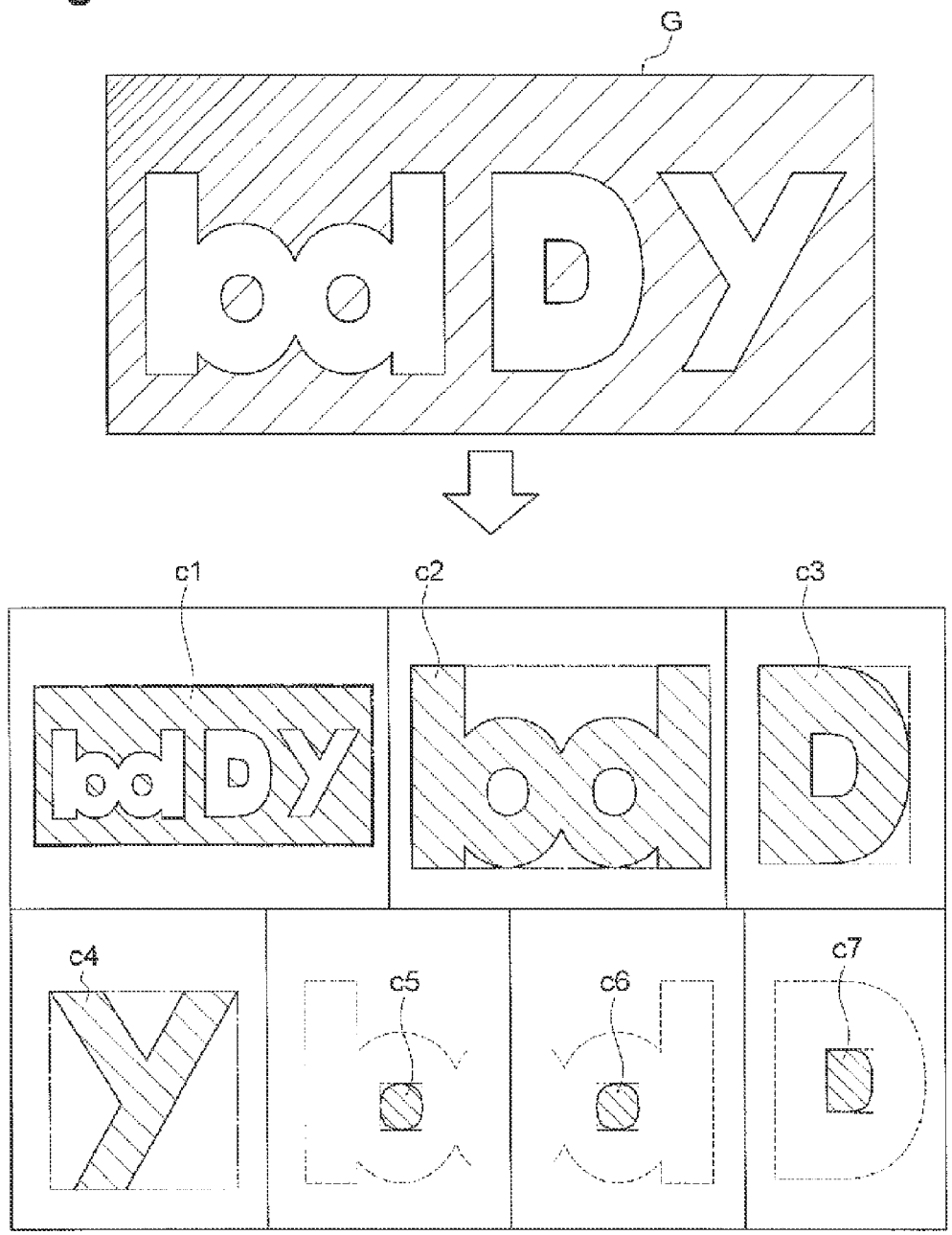
FIG. 7 is a diagram showing an example of extracting single-color regions.
Figure 8:
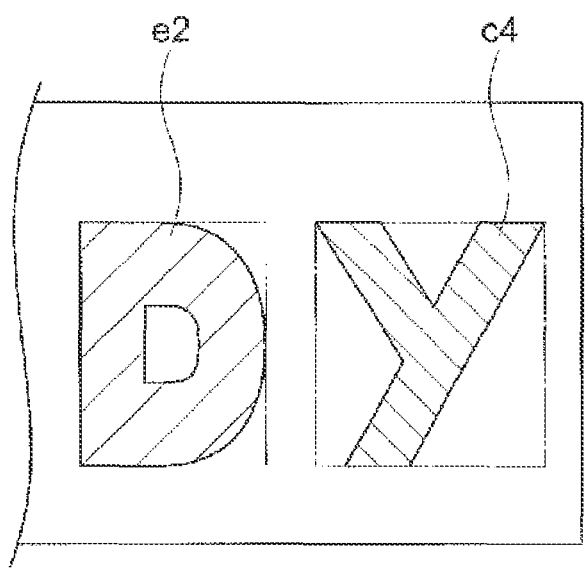
FIG. 8 is a diagram showing an example of overlap between a SWT region and a single-color region.

FIG. 7 shows an example of a plurality of single-color regions c1 to c7 extracted from an image G (image data). In this example, although the single-color region c1 shows the entire background of the image G, the background part can be divided into a plurality of single-color regions depending on the setting of a cluster. The single-color regions c2 to c4 respectively correspond to the letters "bd", "D" and "y". On the other hand, there is a case where a part that is recognized as the background by humans is extracted as the single-color region, such as the single-color regions c5 to c7.

Although the single-color regions extracted by the second extraction unit 13 are not always accurate as described above, after the second extraction unit 13 extracts one or more single-color regions anyway, it generates component data for each of the single-color regions.

The component data representing one single-color region contains the following data items.
Reference coordinates (Xc,Yc) of the circumscribed rectangle of the single-color region
Width Wc of the circumscribed rectangle
Height Hc of the circumscribed rectangle
Coordinates and color number $(xc_i, yc_i, c_i)$ of each pixel $pc_i$ included in the single-color region For example, when the single-color region is composed of twenty pixels $pc_1$ to $pc_{20}$, the component data contains $(xc_1,yc_1,c_1),(xc_2,yc_2,c_2)\ldots, (xc_{20},yc_{20},c_{20})$.

In FIG. 7, the circumscribed rectangle of each single-color region is indicated by dashed lines. As in the case of the SWT region, coordinates to be set as the reference coordinates of the circumscribed rectangle are not particularly limited.

The color number is a numerical value indicating the color (representative color) of a cluster, which is different from a pixel value indicating the original color of a pixel. The color number of the pixel $pc_i$ in the component data of one single-color region is the same.

The second extraction unit 13 outputs the component data of one or more single-color regions, together with the component data of the SWT regions, to the specifying unit 14.

The specifying unit 14 is a functional element that refers to the component data of the SWT regions and the single-color regions and specifies a pixel group included in candidate text regions. The "pixel group" in this specification is a set of one or more pixels Processing performed by the specifying unit 14 on each SWT region is described hereinafter. First, the specifying unit 14 compares the circumscribed rectangle of one SWT region with the circumscribed rectangle of each of the input single-color regions, and selects the single-color region where at least part of the circumscribed rectangle overlaps the circumscribed rectangle of the SWT region. Referring to the examples of FIGS. 5 and 7, when the current region to be processed is the SWT region e2, the single-color regions whose circumscribed rectangle overlaps that of the SWT region e2 are the single-color regions c1, c3 and c7, and the second extraction unit 13 extracts those three single-color regions only. The other single-color regions with no overlap of the circumscribed rectangle, such as the relationship of the SWT region e2 and the single-color region c4, are excluded at this point.

In the case where there is no single-color region having the overlap of the circumscribed rectangle, the specifying unit 14 discards the current SWT region and proceeds to the processing of the next SWT region. To discard the SWT region means that no candidate text region is specified based on that SWT region.

On the other hand, in the case where one or more single-color regions are selected, the specifying unit 14 computes, for each of the selected single-color regions, the number of pixels $A_i$ in the overlap part with the SWT region to be processed and arranges the single-color regions in descending order of the value $A_i$. The specifying unit 14 then specifies the single-color region with the maximum number of pixels $A_i$ in the overlap part by the arrangement, computes the number of pixels $A_c$ included in this single-color region and determines whether a ratio R of the number of pixels $A_i$ to the value $A_c$ is equal to or more than a reference value $R_i$. The "overlap part" between a certain SWT region and a certain single-color region indicates the part that is included in both of the SWT region and the single-color region. The "overlap" means the situation where a certain pixel is a component of the SWT region and also a component of the single-color region.

The reference value $R_t$ is set for the purpose of discarding the SWT region that is incorrectly extracted in the background of the image and specifying the single-color region that is similar in shape and size to the SWT region. The reference value $R_t$ may be set to 0.8 or 0.7, for example, or may be set to another value to fulfill the purpose. Note that the specifying unit 14 may determine whether the ratio R is larger than the reference value $R_t$ or not. The specifying unit 14 may use any of "equal to or more than", "equal to or less than", "less than" and "more than" when comparing the ratio R and the reference value $R_t$.

Figure 9:
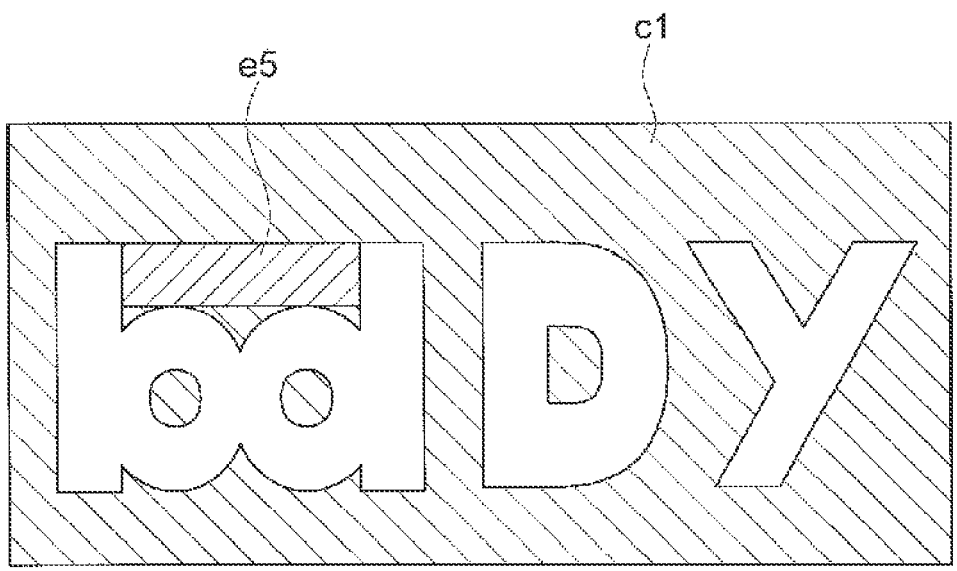
FIG. 9 is a diagram showing another example of overlap between a SWT region and a single-color region.

In the example of FIG. 9, the SWT region e5 exists in the background, and the SWT region e5 should not be processed as a candidate text region. In this embodiment, because the single-color region c1 corresponding to the background is significantly larger than the SWT region e5, even if the entire SWT region e5 overlaps the single-color region c1, $A_i/A_c$ is a very small value that is less than the reference value $R_t$. In this case, the specifying unit 14 ends the processing on the SWT region e5 at this point, and this means that the specifying unit 14 discards the SWT region e5 and does not specify any candidate text region from the SWT region e5.

Figure 10:
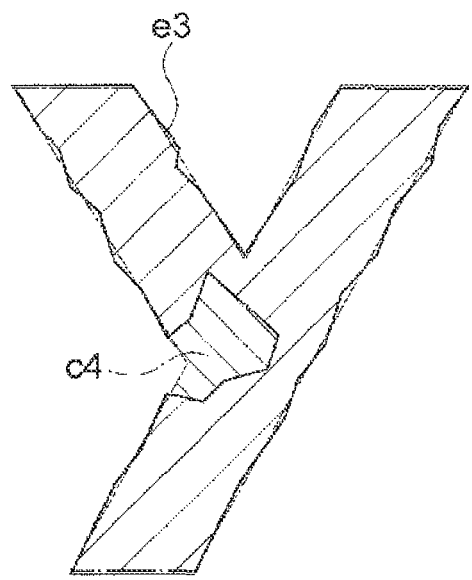
FIG. 10 is a diagram showing another example of overlap between a SWT region and a single-color region.

On the other hand, in the example of FIG. 10, the single-color region c4 is substantially the same size as the SWT region e3, and those two regions mostly overlap, and therefore $A_i/A_c$ is a large value that can be equal to or more than the reference value $R_t$. If $A_i/A_c \geq R_t$ is actually satisfied, the specifying unit 14 leaves the SWT region e3 as a candidate text region.

If $R=A_i/A_c \geq R_t$ is satisfied for the single-color region with the maximum number of pixels $A_i$ in the overlap part, the specifying unit 14 leaves the current SWT region as a candidate text region, and fills the pixels in the part that is estimated to be missing in the SWT region with the pixels of the single-color region. The processing of filling the missing part of the SWT region means to update the part where the pixel value is null with the pixel value of the single-color region. In this specification, the processing of filling the pixel is referred to also as "complementation". In the example of FIG. 10, the specifying unit 14 complements the joint of strokes and a part of the edge that are missing in the SWT region e3 with the pixels of the single-color region c4. By this complementation, the pixel group included in the candidate text region is specified. Note that, in the case where the SWT region completely or substantially represents a text region, the complementation by the pixels of the single-color region is not actually done; however, in this case also, it is regarded that the specifying unit 14 specifies the pixel group included in the candidate text region.

Figure 11:
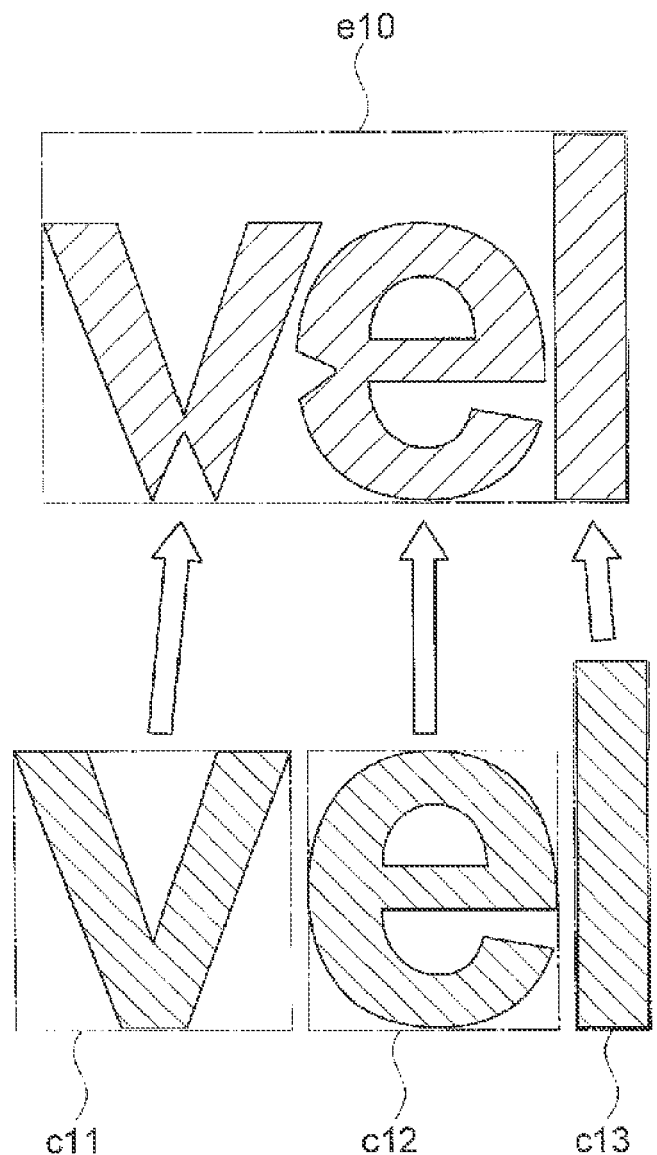
FIG. 11 is a diagram showing another example of overlap between a SWT region and a single-color region.

In the case where there are a plurality of selected single-color regions, after the specifying unit 14 is done with the complementation, it performs the same processing on the other single-color regions. To be specific, the specifying unit 14 determines whether $R=A_i/A_c \geq R_t$ is satisfied for the other single-color regions, and when the condition is satisfied, it further complements the SWT region with the pixels of the single-color region. Due to the effect of the resolution of image data or the like, cases can occur where a plurality of letters are included in one SWT region in the SWT, whereas a single-color region is obtained for each letter in the clustering based on pixel values. FIG. 11 shows an example in which, for a letter string "vel", one SWT region e10 and three single-color regions c11, c12 and c13 are obtained. In this example, assuming that the specifying unit 14 arranges the three single-color regions in descending order of the number of pixels $A_i$ in the overlap part, the single-color region c13, the single-color region c12 and the single-color region c11, the specifying unit 14 first determines whether $R=A_i/A_c \geq R_t$ is satisfied for the single-color region c13, and when the condition is satisfied, it complements the SWT region e10 with the pixels of the single-color region c13. Further, when $R=A_i/A_c \geq R_t$ is satisfied for the single-color region c11, the specifying unit 14 complements the SWT region e10 with the pixels of the single-color region c11, and when $R=A_i/A_c \geq R_t$ is satisfied for the single-color region c12, the specifying unit 14 complements the SWT region e10 with the pixels of the single-color region c12.

On the other hand, if $R=A_i/A_c < R_t$ is satisfied for the single-color region with the maximum number of pixels $A_i$ in the overlap part, the specifying unit 14 discards the current SWT region without performing further processing and proceeds to the processing of the next SWT region. When a plurality of single-color regions that overlap one SWT region are extracted, if the above-described ratio is less than a reference value for the single-color region with the maximum number of pixels in the overlap part, the single-color region is considered to be the background region. Accordingly, the specifying unit 14 can estimate that the SWT region is not text but a part of the background and end the processing of the SWT region without performing further processing on the other single-color regions. In this manner, by making determination on the single-color region with the maximum number of pixels in the overlap part firstly, it is possible to skip useless processing.

The specifying unit 14 performs the above processing on all of the input SWT regions. As a result, the input SWT regions are sorted into those that are specified as candidate text regions and those that are discarded. The SWT regions that are specified as candidate text regions can include those that are complemented with the pixels of the single-color region. The specifying unit 14 outputs the SWT regions which satisfy the condition of $R=A_i/A_c \geq R_t$ and where the pixels are complemented according to need as the final candidate text regions. Note that a method of outputting the candidate text regions is not limited. For example, the specifying unit 14 may display information about the candidate text regions on a monitor, output them through a printer, store them into a given database, or transmit them to another information processing device through a communication network.

There are several specific methods for the complementation. As one example, the specifying unit 14 may perform the complementation by calculating a simple logical sum of the SWT region and the single-color region. The complementation by the logical sum is processing of setting a group of pixels that belong to at least one of the SWT region and the single-color region as a candidate text region. Alternatively, the specifying unit 14 may set the single-color region as a candidate text region and thereby specify the pixel group constituting the single-color region as the pixel group included in the candidate text region without using the SWT region.

Alternatively, the specifying unit 14 may complement the SWT region without using the pixels of the single-color region which are located outside the edge of the SWT region, by using the rest of pixels of the single-color region. When the contrast between the color of the text region and the color of the adjacent background region is low and the edge is weak, an accurate edge can be obtained by the SWT region rather than the single-color region in some cases. If the logical sum is simply used in such a case, the part that does not need to be complemented is complemented with the single-color region, which causes an error in the shape of the candidate text region. Thus, in order to more accurately specify the pixels included in the candidate text region, the specifying unit 14 may complement the SWT region only with the rest of pixels of the single-color region without using the pixels that are outside the edge of the SWT region. In order to implement this processing, it is necessary to find which pixel forms the edge. As one example, the first extraction unit 12 may add a flag indicating whether the pixel is the edge or not to the information of each pixel of the component data of the SWT region. Specifically, the information of each pixel $pe_i$ included in the SWT region may be the coordinates of $pe_i$, the stroke width, and the edge flag $(xe_i, ye_i, w_i, f_i)$. For example, if the pixel is the edge, $f_i=1$, and if the pixel is not the edge, $f_i=0$.

Figure 12:
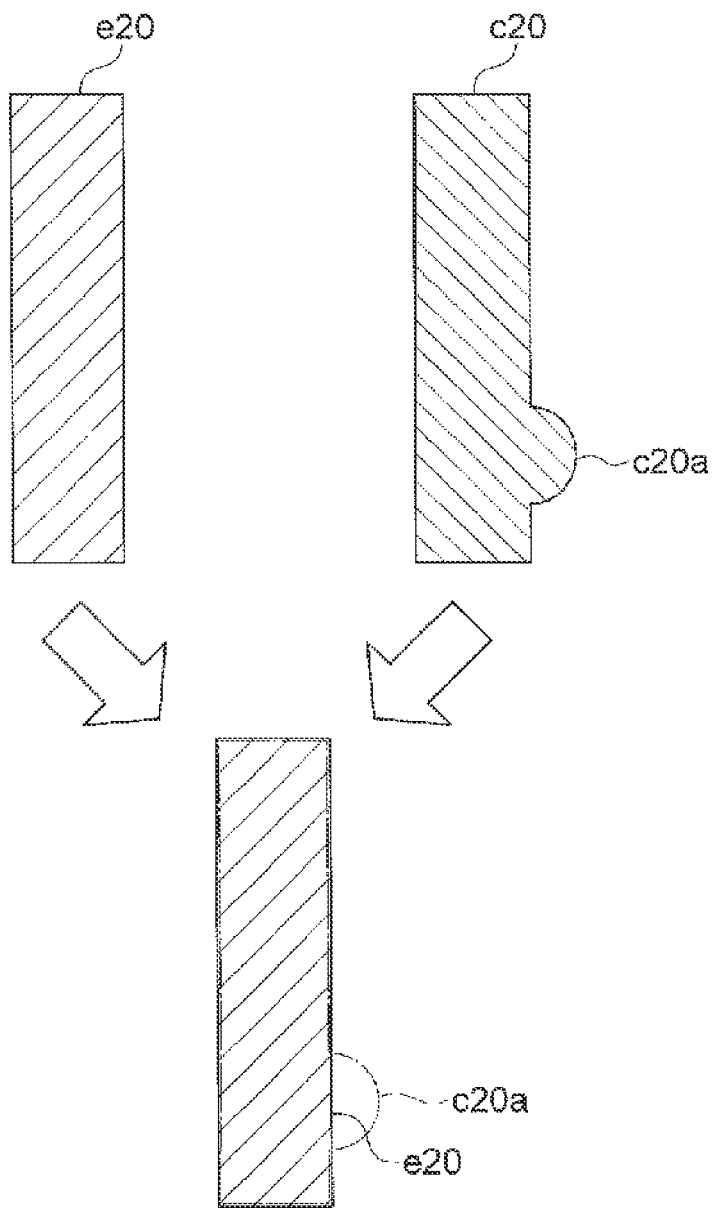
FIG. 12 is a diagram showing an example of complementing a SWT region.

An example of complementation based on the edge of the SWT region is described hereinafter with reference to FIGS. 12 and 13. In the example of FIG. 12, it is assumed that all of the pixels located at the boundary of the SWT region e20 are determined as edges. Further, it is assumed that the single-color region c20 is obtained corresponding to the SWT region e20 by the clustering based on pixel values. If a simple logical sum of those two regions is calculated in this case, a small dome-shaped part c20a like a bulge in the single-color region c20 is incorrectly specified as the pixels of the candidate text region; however, it might be preferred to use the edge that is determined in the SWT without ignoring it. Accordingly, the specifying unit 14 complements the SWT region e20 without using the pixels of the small dome-shaped part c20a that is outside the edge of the SWT region e20, by using only the other pixels of the single-color region c20. Note that, in the example of FIG. 12, there is no pixel whose pixel value is updated from null to a significant value by the complementation as a result.

Figure 13:
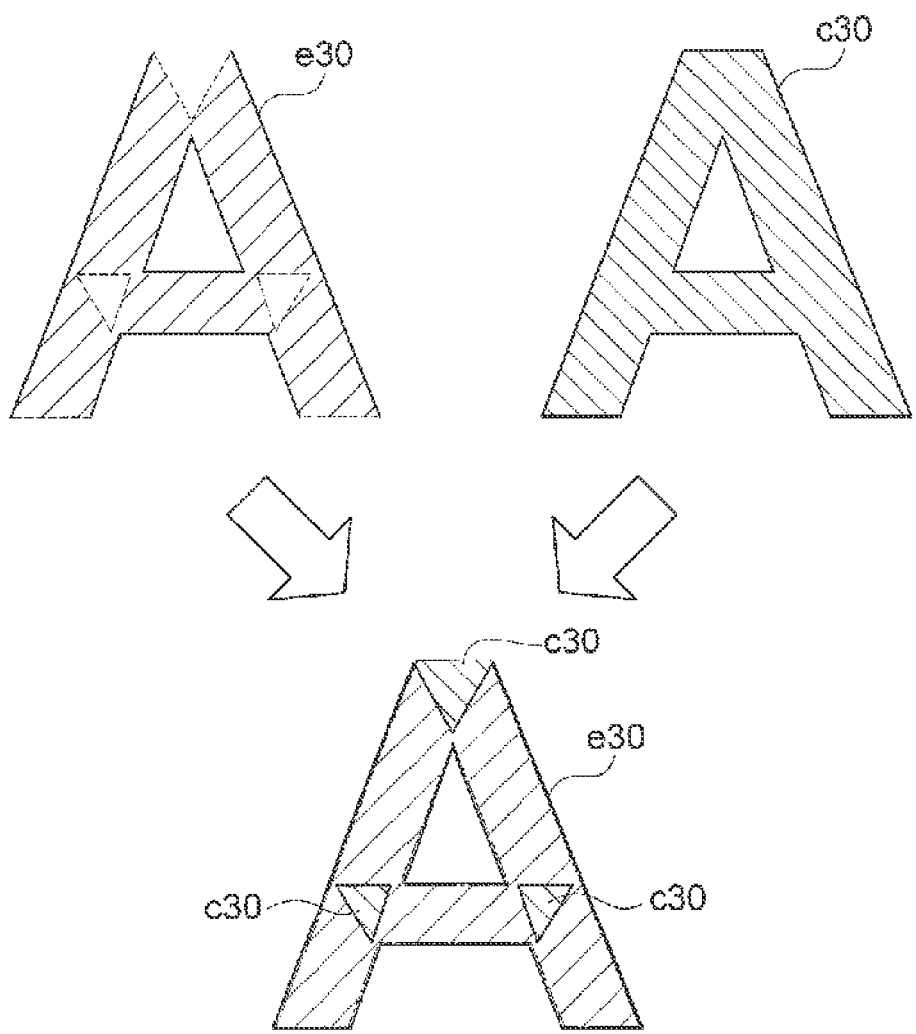
FIG. 13 is a diagram showing another example of complementing a SWT region.

In FIG. 13, a part of the boundary of the SWT region e30 that is determined as the edge by the SWT is indicated by a solid line, and a part that is not determined as the edge but is eventually serve as the boundary is indicated by a dotted line. On the other hand, it is assumed that the single-color region c30 is obtained corresponding to the SWT region e30 by the clustering based on pixel values. In this case, there is no pixel of the single-color region c30 that is outside the edge of the SWT region e30. Accordingly, the specifying unit 14 complements the missing part (the corner and the joint of strokes) of the SWT region e30 with the pixels of the single-color region c30.

Note that the example of FIG. 10 can be considered in the same manner as FIG. 13. Specifically, because the boundary that defines the missing part of the stroke joint in the SWT region e3 is not determined as the edge by the SWT, the specifying unit 14 complements the missing part with the pixels of the single-color region c4. As for the complementation of the edge of the SWT region e3, the specifying unit 14 complements the SWT region e3 with the pixels of the single-color region c4 that are inside the edge (to be more specific, the pixels determined as the edge) of the SWT region e3 without using the pixels that are outside the edge of the SWT region e3.

Alternatively, the specifying unit 14 may compute a region (differential region) that is included in the single-color region but is not included in the SWT region and compute an additional edge in the differential region and thereby enlarge the SWT region, and then complement the missing part of the enlarged SWT region with the pixels of the single-color region. To be specific, the specifying unit 14 calculates a difference between the SWT region (which is referred to as "original SWT region") and the single-color region and thereby computes the differential region. Then, the specifying unit 14 determines whether there is another SWT region that is included in the differential region and has the same range of the stroke width as the original SWT region and, when there is such another SWT region, determines this another SWT region as a candidate for an enlarged part. The specifying unit 14 then performs the SWT by using the edge threshold Tb that is smaller than the edge threshold Ta used in the SWT by the first extraction unit 12 and thereby determines whether there is an additional region that is included in the differential region and has the same range of the stroke width as the original SWT region. If there is such an additional region, the specifying unit 14 enlarges the original SWT region by connecting the original SWT region, the additional region and another SWT region, if any. The specifying unit 14 then complements the missing part of the enlarged SWT region with the pixels of the single-color region. At this time, the specifying unit 14 complements the SWT region only with the rest of the pixels of the single-color region without using the pixels of the single-color region that are outside the edge of the enlarged SWT region. On the other hand, when there is no additional region, the specifying unit 14 complements the missing part of the SWT region with the pixels of the single-color region without enlarging the original SWT region.

Figure 14:
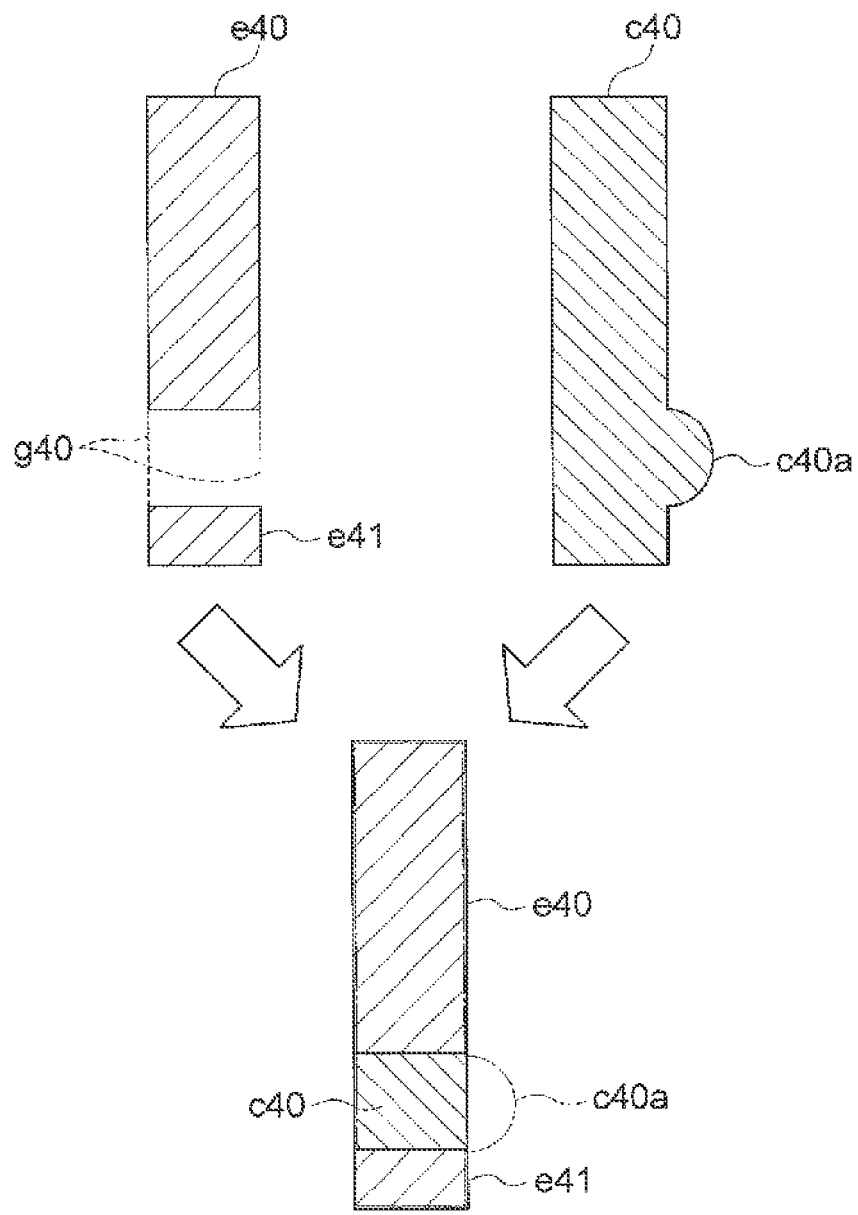
FIG. 14 is a diagram showing another example of complementing a SWT region.

FIG. 14 shows an example of complementation that accompanies the enlargement of the SWT region. In this example, it is assumed that the single-color region c40 is obtained corresponding to the SWT region e40 by the clustering based on pixel values, and the condition of $R=A_i/A_c \geq R_r$, which is a precondition for the complementation, is satisfied. In this case, the specifying unit 14 determines another SWT region e41 that is located in the differential region obtained from the original SWT region e40 and the single-color region c40 as a candidate for the enlarged part. Further, the specifying unit 14 performs the SWT using the edge threshold Tb and thereby obtains the additional region indicated by the edge g40. Then, the specifying unit 14 enlarges the original SWT region e40 by connecting the two SWT regions e40 and e41 and the additional region. The specifying unit 14 then complements the enlarged SWT region without using the pixels of the small dome-shaped part c40a that are outside the edge of the enlarged SWT region, only by using the other pixels of the single-color region c40. Note that, in the example of FIG. 14, there is no pixel whose pixel value is updated from null to a significant value by the complementation as a result.

Note that, after specifying the pixel group of a candidate text region, the specifying unit 14 may perform processing to make fine adjustment of the edge of the candidate text region. For example, the specifying unit 14 may include surrounding pixels into the candidate text region depending on the pixel values surrounding the edge or perform processing to smoothen the edge.

The operation of the image processing apparatus 10 is described and further an image processing method according to this embodiment is described hereinafter with reference to FIGS. 15 and 16.

Figure 15:
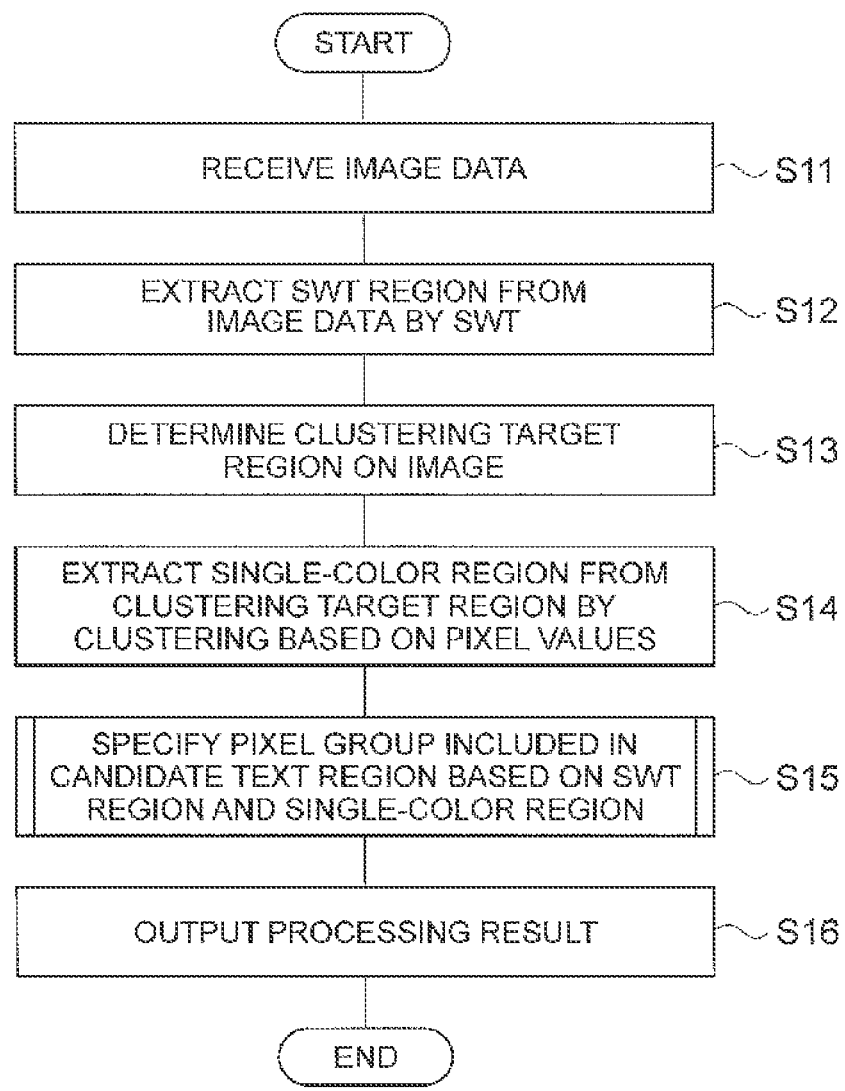
FIG. 15 is a flowchart showing an operation of the image processing apparatus according to the embodiment.
Figure 16:
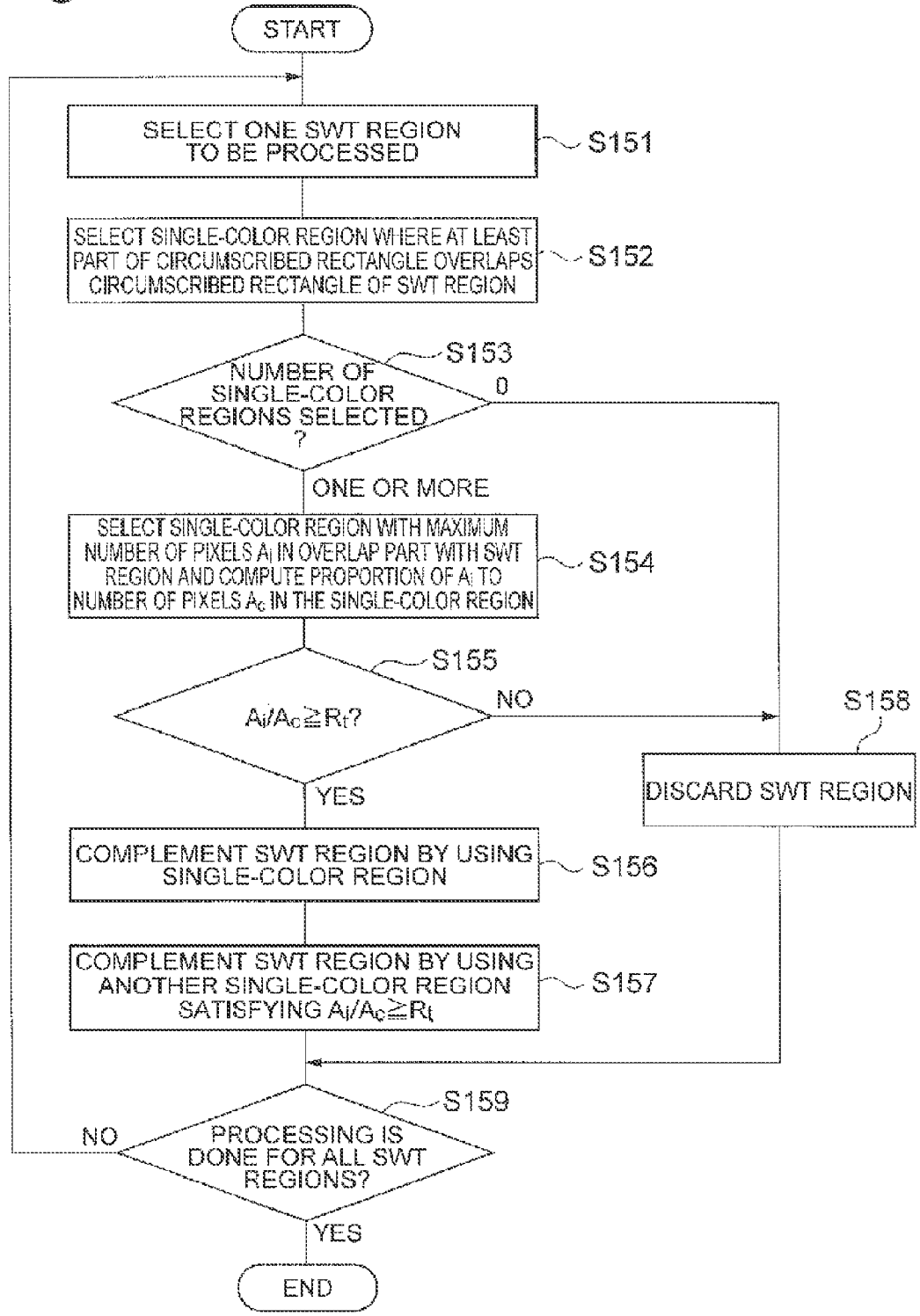
FIG. 16 is a flowchart showing a process of specifying a pixel group for a candidate text region.

FIG. 15 shows an overall flow of the image processing method according to this embodiment. First, the receiving unit 11 receives image data (Step S11). Next, the first extraction unit 12 extracts one or more SWT regions from the image data by SWT (Step S12, first extraction step).

Then, the second extraction unit 13 determines a clustering target region on the image based on those SWT regions (Step S13) and specifies one or more single-color regions from the clustering target region by clustering based on pixel values (Step S14, second extraction step). After that, the specifying unit 14 specifies a pixel group included in a candidate text region based on the SWT regions and the single-color regions (Step S15, specifying step) and outputs the specified result (Step S16). By this process, a part where text is estimated to be drawn in the image is extracted.

The details of the processing of specifying a pixel group in a candidate text region (Step S15) are described with reference to FIG. 16. The specifying unit 14 selects one SWT region to be processed (Step S151) and selects the single-color region where at least part of the circumscribed rectangle overlaps the circumscribed rectangle of the SWT region (Step S152).

In the case where one or more single-color regions can be selected ("one or more" in Step S153), the specifying unit 14 selects the single-color region with the maximum number of pixels $A_i$ in the overlap part with the SWT region and calculates the ratio R of the value $A_i$ to the number of pixels $A_c$ in the single-color region (Step S154). Then, when the ratio is equal to or more than the reference value $R_t$ (YES in Step S155), the specifying unit 14 leaves the SWT region as a candidate text region, and complements the SWT region with the pixels of the single-color region (Step S156). In the case where a plurality of single-color regions are selected in Step S153, the specifying unit 14 tries to complement the SWT region with another single-color region that is not selected in Step S154 (Step S157). To be specific, if the ratio of the number of pixels $A_i$ in the overlap part between the single-color region and the SWT region to the number of pixels $A_c$ of the single-color region is equal to or more than the reference value $R_t$, the specifying unit 14 further complements the SWT region by using this singe-color region as well.

On the other hand, in the case where there is no single-color region having the overlap of the circumscribed rectangle with the SWT region ("0" in Step S153), the specifying unit 14 discards the SWT region selected in Step S151 (Step S158). Further, in the case where $R=A_i/A_c<R_t$ is established for the single-color region with the maximum number of pixels $A_i$ in the overlap part (NO in Step S155) also, the specifying unit 14 discards the selected SWT region (Step S158).

The specifying unit 14 performs the processing of Steps S151 to S158 on all of the SWT regions to be processed (see Step S159).

Figure 17:
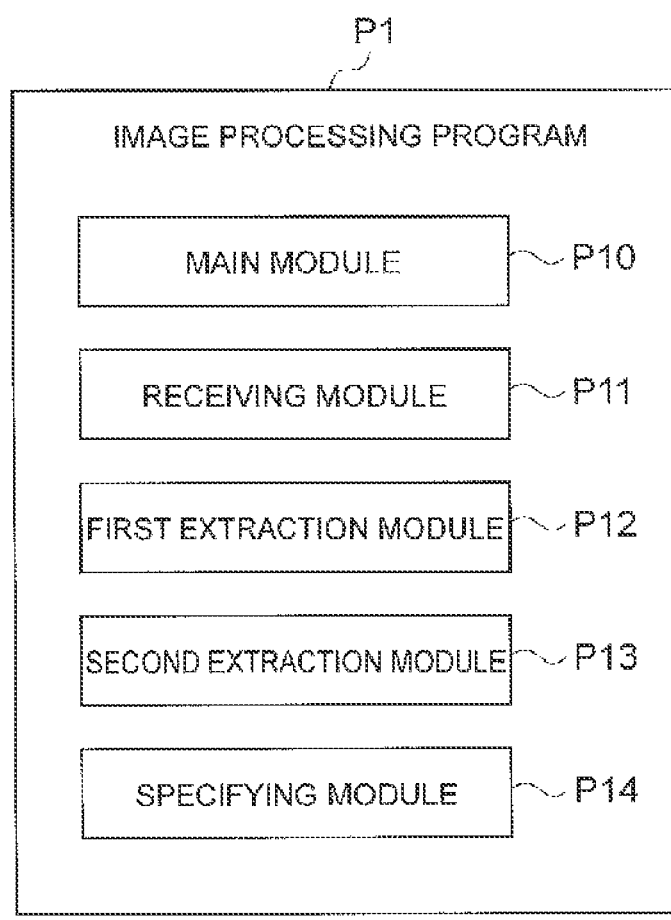
FIG. 17 is a diagram showing a configuration of an image processing program according to the embodiment.

An image processing program P1 that causes a computer to function as the image processing apparatus 10 is described hereinafter with reference to FIG. 17.

The image processing program P1 includes a main module P10, a receiving module P11, a first extraction module P12, a second extraction module P13, and a specifying module P14.

The main module P10 is a part that exercises control over the image processing. The functions implemented by executing the receiving module P11, the first extraction module P12, the second extraction module P13 and the specifying module P14 are equal to the functions of the receiving unit 11, the first extraction unit 12, the second extraction unit 13 and the specifying unit 14 described above, respectively.

The image processing program P1 is provided in the form of being recorded in a static manner on a tangible recording medium such as CD-ROM or DVD-ROM or semiconductor memory, for example. Alternatively, the image processing program P1 may be provided as a data signal superimposed onto a carrier wave through a communication network.

As described above, an image processing apparatus according to one aspect of the present invention includes a first extraction unit configured to perform stroke width transform on an image and thereby extract a SWT region from the image, the SWT region being a region having a continuous edge and a stroke width within a set range; a second extraction unit configured to perform clustering based on pixel values on the image and thereby extract a single-color region from the image, the single-color region being a region composed of a plurality of pixels having pixel values within a set range and present continuously; and a specifying unit configured to specify a pixel group included in a candidate text region based at least on the single-color region when a ratio of the number of pixels in an overlap part between the SWT region and the single-color region to the number of pixels in the single-color region is equal to or more than a first reference value, or more than the first reference value.

An image processing method according to one aspect of the present invention is an image processing method performed by an image processing apparatus including a processor, the method including a first extraction step of performing stroke width transform on an image and thereby extracting a SWT region from the image, the SWT region being a region having a continuous edge and a stroke width within a set range; a second extraction step of performing clustering based on pixel values on the image and thereby extracting a single-color region from the image, the single-color region being a region composed of a plurality of pixels having pixel values within a set range and present continuously; and a specifying step of specifying a pixel group included in a candidate text region based at least on the single-color region when a ratio of the number of pixels in an overlap part between the SWT region and the single-color region to the number of pixels in the single-color region is equal to or more than a first reference value, or more than the first reference value.

An image processing program according to one aspect of the present invention causes a computer to function as a first extraction unit to perform stroke width transform on an image and thereby extract a SWT region from the image, the SWT region being a region having a continuous edge and a stroke width within a set range; a second extraction unit to perform clustering based on pixel values on the image and thereby extract a single-color region from the image, the single-color region being a region composed of a plurality of pixels having pixel values within a set range and present continuously; and a specifying unit to specify a pixel group included in a candidate text region based at least on the single-color region when a ratio of the number of pixels in an overlap part between the SWT region and the single-color region to the number of pixels in the single-color region is equal to or more than a first reference value, or more than the first reference value.

In the above aspects, in addition to extraction of a SWT region by SWT, extraction of a single-color region by clustering based on pixel values is performed independently of the SWT. Then, when an overlap part between the SWT region and the single-color region has a certain ratio to the single-color region, a pixel group included in a candidate text region is specified. In this manner, by using a technique based on pixel values, not edges, in combination with the SWT and using two types of regions obtained from those two techniques, it is possible to make up for disadvantages of the technique based on edges and more reliably extract a text region from an image. It is thereby possible to enhance the accuracy of subsequent processing such as letter string recognition.

The SWT is one of powerful techniques to extract a text region. However, as described above, the lack of pixels occurs at the corner or the joint of strokes, and a part of the background is extracted as a stroke in some cases. Further, although the SWT is performed on condition that the edge of text is detectable, if the edge of text is weak due to the reason that the pixel values of the text and the background are close, for example, the edge cannot be extracted, and the text region cannot extracted accordingly.

As a technique to compensate for the SWT, MSER can be used. However, because the MSER is also the technique that extracts a text region based on edges just like the SWT, if a weak edge exists in an image, the edge cannot be detected, and the text region cannot extracted accordingly.

On the other hand, if clustering based on pixel values, which does not take edges into consideration, is used, it is likely to be able to extract the missing part of the SWT region. Therefore, using the SWT and the clustering based on pixel values in combination, by extracting a region that cannot be extracted by the SWT as a single-color region and complementing the SWT region with the pixels of the single-color region, it is possible to extract a candidate text region more accurately than the existing techniques.

Figure 18:
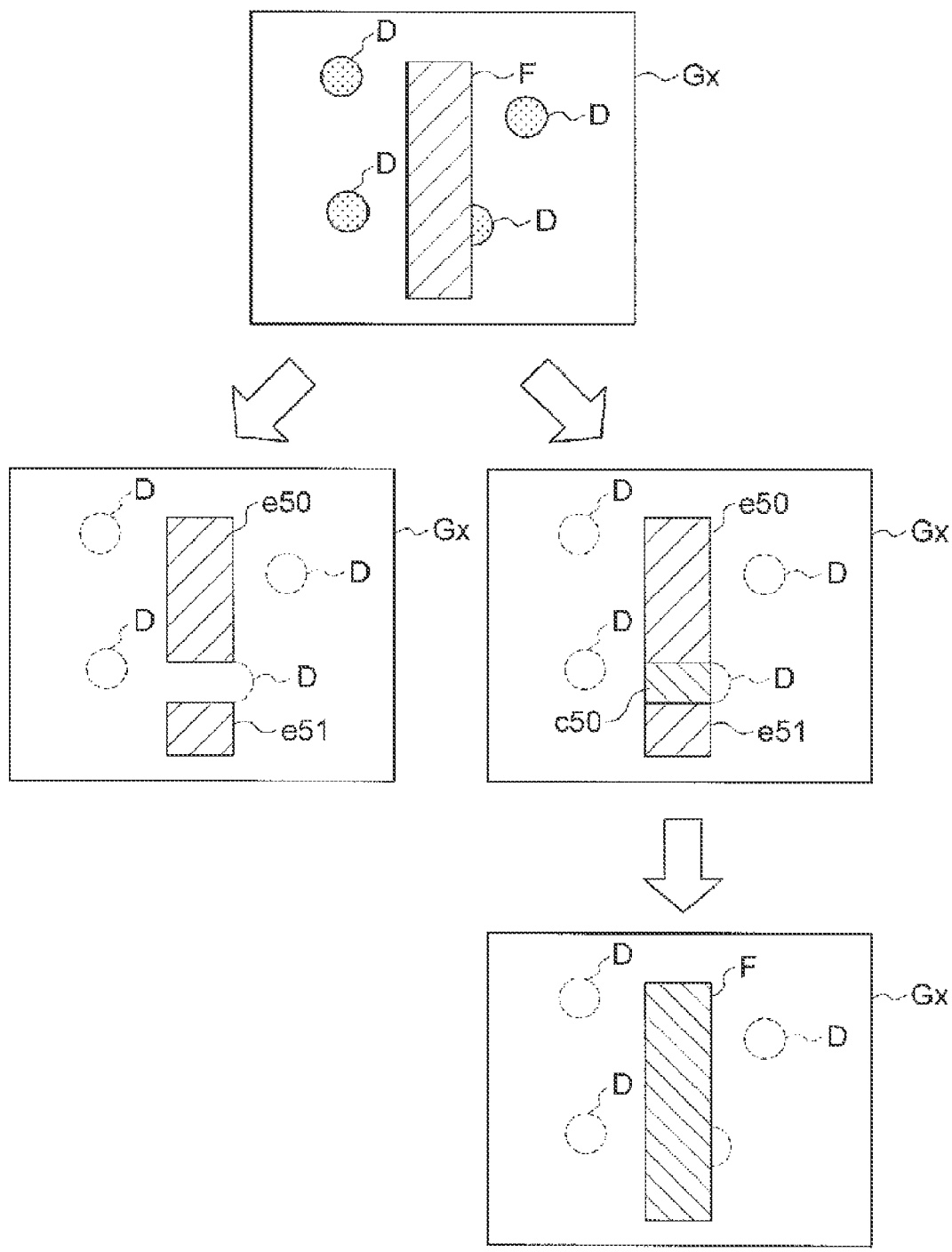
FIG. 18 is a diagram illustrating effects of image processing according to the embodiment.

This advantageous effect is described with reference to the example of FIG. 18. In the image Gx shown in FIG. 18, a foreground F that should be extracted as a text region and dots D as a background in the similar color to the foreground F are drawn (see the top of FIG. 18). When the edge of a part where the foreground F and the dot D are adjacent is weak and the edge of this part cannot be extracted by the SWT, the foreground F is separated into two SWT regions e50 and e51 (see the middle left of FIG. 18). Even if the MSER is applied to this image Gx, because a closed curve cannot be found, it is not possible to complement the space between the two SWT regions e50 and e51. On the other hand, in the case of using the clustering based on pixel values, because the entire foreground F can be extracted as a single-color region c50 depending on the setting of the color used in the clustering (see the middle right of FIG. 18), the missing part is complemented, and it is thereby possible to specify the foreground F as a candidate text region (see the bottom of FIG. 18).

As shown in the single-color region c1 of FIG. 7, in the clustering based on pixel values, the part that is not actually text can be extracted as a single-color region. However, by considering the ratio of the number of pixels in an overlap part between the SWT region and the single-color region to the number of pixels in the single-color region, it is possible to reliably specify the part where text is actually drawn as a candidate text region.

In an image processing apparatus according to another aspect, the specifying unit may refrain from specifying a candidate text region from the SWT region and the single-color region when the ratio is less than a second reference value. In the case where the above ratio is small because the number of pixels of the single-color region that overlaps the SWT region is significantly larger than the number of pixels in the overlap part, it is highly likely that the SWT region is not actually the text and located in the background. Thus, by not specifying a candidate text region when the ratio is less than a reference value, it is possible to more reliably prevent the case where a part of the background is detected as text.

In an image processing apparatus according to another aspect, when the first reference value and the second reference value are the same, and when the second extraction unit extracts a plurality of single-color regions, the specifying unit may select the single-color region having the maximum number of pixels in the overlap part with the SWT region, and when a ratio of the number of pixels in the overlap part between the SWT region and the selected single-color region to the number of pixels in the selected single-color region is equal to or more than the first reference value, the specifying unit may specify a pixel group included in the candidate text region based on the SWT region and the selected single-color region, and when the ratio is less than the first reference value, the specifying unit may refrain from specifying the candidate text region.

In the case where a plurality of single-color regions are extracted for one SWT region, by making determination based on the single-color region with the maximum number of pixels in the overlap part with the SWT region first, it is possible to immediately determine whether it should be specified as a candidate text region or not. For example, if the above ratio is less than a reference value for the single-color region with the maximum number of pixels in the overlap part, it can be determined that the SWT region cannot be a candidate text region at this point, and it is thereby possible to end the processing on the SWT region without any further processing on the other single-color regions. This reduces the processing time.

In an image processing apparatus according to another aspect, the second extraction unit may set a part of the image as a clustering target region based on the SWT region extracted by the first extraction unit and extract the single-color region from the clustering target region. In general, the clustering based on pixel values requires high processing load. By performing the clustering only on the clustering target region where text is estimated to be drawn, the search range in the single-color region is limited, and it is thereby possible to reduce the load of image processing.

In an image processing apparatus according to another aspect, the specifying unit may specify a pixel group included in the candidate text region by complementing a missing part of the SWT region with pixels of the single-color region. By complementing a part that is not extracted in the SWT region with the pixels of the single-color region, it is possible to accurately specify the pixel group of the candidate text region.

In an image processing apparatus according to another aspect, the specifying unit may specify a logical sum of the SWT region and the single-color region as a pixel group included in the candidate text region. By specifying the pixel group of the candidate text region by simple logical sum operation, it is possible to specify the candidate text region easily and quickly.

In an image processing apparatus according to another aspect, the specifying unit may complement the missing part without using pixels of the single-color region outside an edge of the SWT region, by using other pixels of the single-color region. The edge specified by the SWT is likely to actually indicate the boundary between the text and the background. Therefore, by complementing another missing part without deleting the edge, it is possible to accurately specify the pixel group of the candidate text region.

In an image processing apparatus according to another aspect, the first extraction unit may perform the stroke width transform using a first edge threshold, and the specifying unit may perform the stroke width transform using a second edge threshold lower than the first edge threshold on a part of the single-color region not overlapping the SWT region and thereby search for an additional edge, and enlarge the SWT region using the additional edge, and complement a missing part of the enlarged SWT region without using pixels of the single-color region outside an edge of the enlarged SWT region, by using other pixels of the single-color region.

Depending on the relationship between the pixel values of the text and the background, there is a case where the edge of the text cannot be specified even in combination of the SWT and the clustering based on pixel values. For example, when a part of the edge is weak due to that the text color and the background color are partly close, there is a possibility that only a part of the text is extracted as the SWT region and the weak edge part cannot be recognized even by the clustering based on pixel values. In such a case, by setting a lower edge threshold than the first SWT and performing the SWT again, the probability of detecting the weak edge arises. Then, by complementing another missing part without deleting the specified edge on the SWT region including the weak edge, which is the enlarged SWT region, it is possible to accurately specify the pixel group of the candidate text region.

In an image processing apparatus according to another aspect, the second extraction unit may extract the single-color region by performing color clustering. While the gray clustering converts an image into gray scale (one-dimensional information) and therefore information about color is lost, the color clustering does not cause such a loss, and the clustering can be more accurately done.

On the other hand, because color information is reduced in the gray clustering, the processing can be done at higher speed.

Hereinbefore, the present invention has been described in detail with respect to the embodiment thereof. However, the present invention is not limited to the above-described embodiment. Various changes and modifications may be made therein without departing from the scope of the invention.

Although the second extraction unit 13 determines the clustering target region and then extracts the single-color regions in the above-described embodiment, the second extraction unit 13 may directly extract the single-color regions from the entire image without determining the clustering target region. In other words, the processing of the above Step S13 can be skipped. For example, if hardware capability of a CPU or the like is high and the single-color regions can be extracted at high speed, processing of determining the clustering target region is omissible. Further, if the clustering target region is not determined, there is no need to refer to the component data of the SWT regions when performing the clustering based on pixel values, and the SWT regions need not to be extracted before extracting the single-color regions. In other words, the image processing apparatus 10 may perform Step S12 and Step S14 in parallel or perform Step S12 after performing Step S14.

Although the specifying unit 14 examines the overlap between the circumscribed rectangle of the SWT region and the circumscribed rectangle of the single-color region and thereby selects the single-color region in the above-described embodiment, the specifying unit 14 may compute the number of pixels Ai in the overlap part between the SWT region and the single-color region and select the single-color region where the number of pixels Ai is one or more, instead of the above processing (the processing of Step S152). Note that, however, by examining the overlap of the circumscribed rectangles, it is possible to easily and quickly select the single-color region.

In the above-described embodiment, when the ratio of the number of pixels in the overlap part between the SWT region and the single-color region to the number of pixels in the single-color region is less than a reference value, the SWT value is discarded. This processing aims mainly at excluding the SWT region that is extracted from a part of the background, and such exclusion of the SWT region may be done by another technique. For example, the receiving unit 11 or the specifying unit 14 may specify a region in the same color as the edge of the image and continuing from the edge as a background region and discard the SWT region that is included in the background region.

Although the specifying unit 14 compares the ratio R of the number of pixels in the overlap part between the SWT region and the single-color region to the number of pixels in the single-color region with one reference value $R_t$ in the above-described embodiment, the specifying unit 14 may compare the ratio R with two different reference values (a first reference value and a second reference value). In this case, the second reference value is smaller than the first reference value. For example, when the ratio R is equal to or more than the first reference value, the specifying unit specifies a group of pixels that belong to at least one of the SWT region and the single-color region as a candidate text region. When the ratio R is less than the first reference value and equal to or more than the second reference value, the specifying unit complements the SWT region without using the pixels of the single-color region outside the edge of the SWT region, by using the rest of the pixels of the single-color region. When the ratio R is less than the second reference value, the specifying unit does not specify a candidate text region from the SWT region and the single-color region. In other words, the specifying unit discards the SWT region. In this manner, the specifying unit may perform first complementation to specify the pixel group of the candidate text region when the ratio R is equal to or more than the first reference value, perform second complementation to specify the pixel group of the candidate text region when the ratio R is less than the first reference value and equal to or more than the second reference value, and refrain from specifying the candidate text region when the ratio R is less than the second reference value.

In comparison with this alternative example, the above-described embodiment is processing when the first reference value and the second reference value are the same, which is, processing when the reference value $R_t$ is both the first reference value and the second reference value.

When making comparisons between two numerical values in the image processing apparatus, any of "equal to or more than", "equal to or less than", "less than" and "more than" may be used. Although the same explanation is provided for the case where the specifying unit 14 compares the ratio R and the reference value $R_t$ in the above-described embodiment, it is not limited to such a case that a way of comparison is arbitrary.

10 . . . image processing apparatus, 11 . . . receiving unit, 12 . . . first extraction unit, 13 . . . second extraction unit, 14 . . . specifying unit, P1 . . . image processing program, P10 . . . main module, P11 . . . receiving module, P12 . . . first extraction module, P13 . . . second extraction module, P14 . . . specifying module

What is claimed is:

1. An image processing apparatus comprising:
at least one memory operable to store computer program code;
at least one processor operable to access said at least one memory and operate as instructed by said program code:
first extraction code configured to cause at least one of said at least one processor to perform stroke width transform (SWT) on an image and thereby extract a SWT region from the image, the SWT region being a region having a continuous edge and a stroke width within a set range;
second extraction code configured to cause at least one of said at least one processor to perform clustering based on pixel values on the image and thereby extract a single-color region from the image, the single-color region being a region composed of a plurality of pixels having pixel values within a set range and present continuously; and
specifying code configured to cause at least one of said at least one processor to specify a pixel group included in a candidate text region based at least on the single-color region when a ratio of the number of pixels in an overlap part between the SWT region and the single-color region to the number of pixels in the single-color region is equal to or more than a first reference value, or more than the first reference value.

2. The image processing apparatus according to claim 1, wherein
the specifying code does not specify a candidate text region from the SWT region and the single-color region when the ratio is less than a second reference value.

3. The image processing apparatus according to claim 2, wherein
the first reference value and the second reference value are the same, and
when the second extraction code extracts a plurality of single-color regions, the specifying code selects the single-color region having the maximum number of pixels in the overlap part with the SWT region, and when a ratio of the number of pixels in the overlap part between the SWT region and the selected single-color region to the number of pixels in the selected single-color region is equal to or more than the first reference value, the specifying code specifies a pixel group included in the candidate text region based on the SWT region and the selected single-color region, and when the ratio is less than the first reference value, the specifying code does not specify the candidate text region.

4. The image processing apparatus according to claim 1, wherein
the second extraction code sets a part of the image as a clustering target region based on the SWT region extracted by the first extraction code, and extracts the single-color region from the clustering target region.

5. The image processing apparatus according to claim 1, wherein
the specifying code specifies a pixel group included in the candidate text region by complementing a missing part of the SWT region with pixels of the single-color region.

6. The image processing apparatus according to claim 5, wherein
the specifying code specifies a logical sum of the SWT region and the single-color region as a pixel group included in the candidate text region.

7. The image processing apparatus according to claim 5, wherein
the specifying code complements the missing part without using pixels of the single-color region outside an edge of the SWT region, by using other pixels of the single-color region.

8. The image processing apparatus according to claim 7, wherein
the first extraction code performs the stroke width transform using a first edge threshold, and
the specifying code performs the stroke width transform using a second edge threshold lower than the first edge threshold on a part of the single-color region not overlapping the SWT region and thereby searches for an additional edge, and enlarges the SWT region using the additional edge, and complements a missing part of the enlarged SWT region without using pixels of the single-color region outside an edge of the enlarged SWT region, by using other pixels of the single-color region.

9. The image processing apparatus according to claim 1, wherein
the second extraction code extracts the single-color region by performing color clustering.

10. An image processing method performed by an image processing apparatus including at least one processor, comprising:
performing stroke width transform on an image and thereby extracting a SWT region from the image, the SWT region being a region having a continuous edge and a stroke width within a set range;
performing clustering based on pixel values on the image and thereby extracting a single-color region from the image, the single-color region being a region composed of a plurality of pixels having pixel values within a set range and present continuously; and
specifying a pixel group included in a candidate text region based at least on the single-color region when a ratio of the number of pixels in an overlap part between the SWT region and the single-color region to the number of pixels in the single-color region is equal to or more than a first reference value, or more than the first reference value.

11. A non-transitory computer readable medium storing an image processing program causing a computer comprising at least one processor operable to access said non-transitory computer readable medium to operate as instructed by said image processing program to implement:
first extraction code configured to cause at least one of said at least one processor to perform stroke width transform on an image and thereby extract a SWT region from the image, the SWT region being a region having a continuous edge and a stroke width within a set range;
second extraction code configured to cause at least one of said at least one processor to perform clustering based on pixel values on the image and thereby extract a single-color region from the image, the single-color region being a region composed of a plurality of pixels having pixel values within a set range and present continuously; and specifying code configured to cause at least one of said at least one processor to specify a pixel group included in a candidate text region based at least on the single-color region when a ratio of the number of pixels in an overlap part between the SWT region and the single-color region to the number of pixels in the single-color region is equal to or more than a first reference value, or more than the first reference value.

* * * * *